Aug. 14, 1945.

G. SMITH 2,382,369

DISPENSING APPARATUS

Filed Feb. 26, 1943

Inventor:
Graydon Smith,
by: Hemway & Witter
Attorneys.

Aug. 14, 1945.  G. SMITH  2,382,369
DISPENSING APPARATUS
Filed Feb. 26, 1943  2 Sheets-Sheet 2
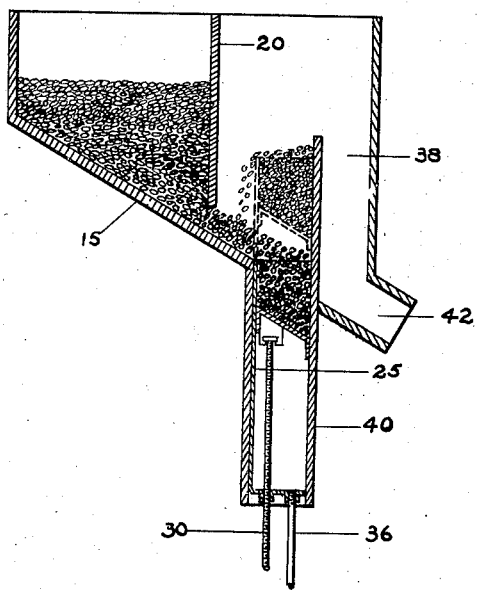
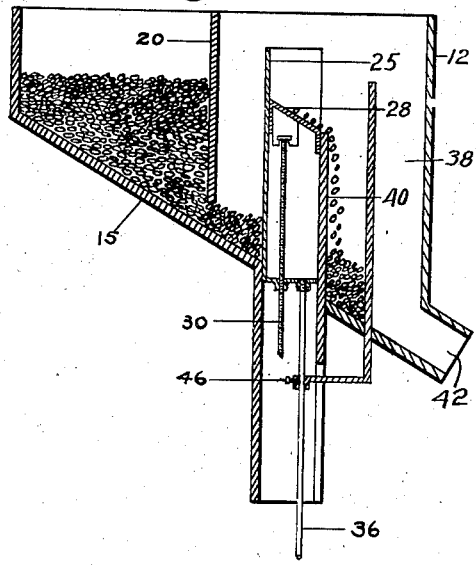
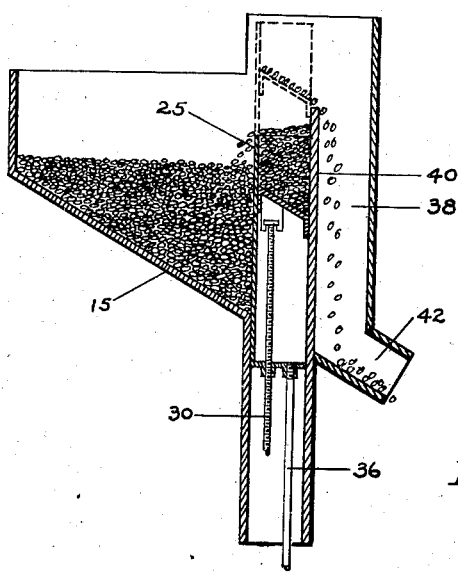
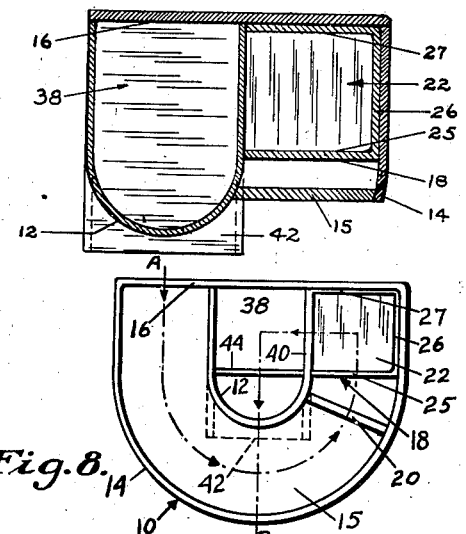
Inventor:
Graydon Smith,
by Kenway & Witter
Attorneys.

Patented Aug. 14, 1945

2,382,369

UNITED STATES PATENT OFFICE 2,382,369

DISPENSING APPARATUS

Graydon Smith, Concord, Mass., assignor to Electricooker, Inc., Newburyport, Mass., a corporation of Massachusetts Application February 26, 1943, Serial No. 477,190

5 Claims. (Cl. 222—205)

This invention relates to a novel dispensing apparatus adapted for use in packaging machines, nut cooking machines, etc., and wherever the dispensing of measured amounts of a unit or granular product is required. One important feature of the invention renders the apparatus more particularly applicable to the dispensing of frangible and brittle materials, such, for example, as shelled nuts. It is highly desirable that such materials shall remain whole and unbroken and their value and quality are greatly decreased by any crushing or breaking of the product. One of the objects of the invention resides in the production of an improved dispensing apparatus which will dispense such products without causing any crushing or breaking thereof.

Some unit products of peculiar shape such as cashew nuts, for example, flow readily by gravity only along hopper channels that are free of corners and like obstructing pockets. While a hopper with straight walls provides such a channel it also utilizes such excessive space as to be impracticable for certain uses. A further object of the invention resides in the production of an improved dispensing apparatus providing a free-flowing hopper channel disposed compactly within a minimum space.

A further feature of the invention resides in the production of an improved dispenser embodying a hopper with a downwardly sloping bottom wall and means for feeding a limited amount of the product therefrom to a dispensing position where a measuring receptacle can by movement through a minimum stroke dispense measured quantities of the product, thereby simplifying the apparatus and substantially shortening the dispensing stroke otherwise required.

My improved dispensing apparatus embodies an especially compact design preferably including a hopper of arcuate or U-shape construction compactly housing therein a discharge chamber and discharge chute for receiving measured quantities of the product and dispensing the same forwardly to the most convenient receiving location. A further feature of the invention resides in means for effecting the discharge of the product at desired predetermined positions of the dispensing stroke of the apparatus, all as hereinafter more specifically described.

These and other features of the invention will be best understood and appreciated from the following description of preferred embodiments thereof selected for purposes of illustration and shown in the accompanying drawings wherein;

Fig. 4 is a sectional development taken along the line A—B of Fig. 1,

Fig. 5 is a plan section taken on line 5—5 of Fig. 2,

Fig. 6 is a sectional development, taken on line A—B of Fig. 8, of a modified construction, Fig. 7 is a view like Fig. 4, but illustrating a modified construction, Fig. 8 is a plan view of the apparatus shown in Fig. 6.

Figure 1:
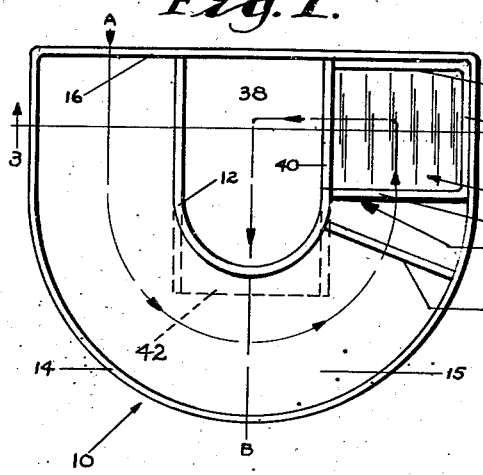
Fig. 1 is a plan view of an apparatus embodying my invention.
Figure 2:
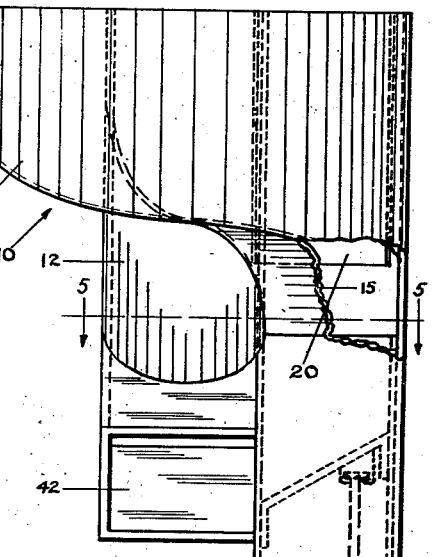
Fig. 2 is a front elevation thereof.
Figure 3:
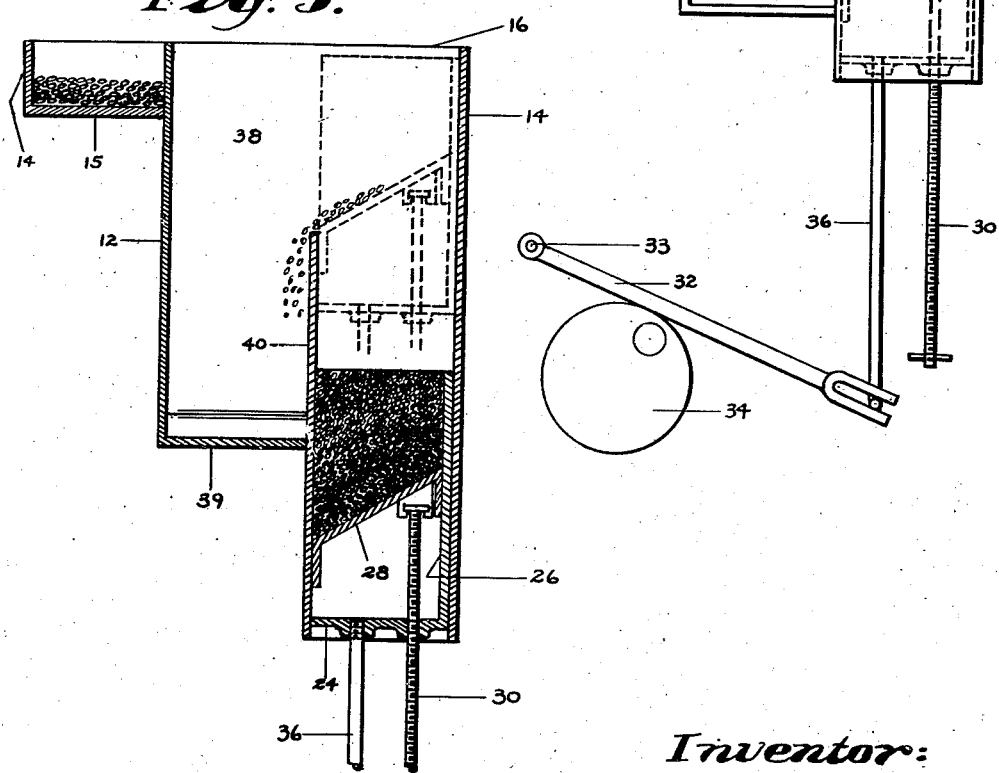
Fig. 3 is a sectional view taken on line 3—3 of Fig. 1.

Referring first to Figs. 1–5 of the drawings, 10 indicates a hopper having inner and outer side walls 12 and 14, a bottom wall 15 and a rear wall 16. The walls 12, 14 and 15 are arcuately curved to U-shape horizontally and the bottom wall 15 slopes downwardly from its highest point adjacent to the wall 16 to its lowest point at 18. Forwardly of and spaced from the point 18 is an upwardly extending wall 20 spaced from the bottom wall 15 and joined to the side walls 12 and 14, the space at the bottom of the wall 20 being sufficient to permit the product being dispensed to pass therebeneath. A measuring receptacle 22 is mounted for vertical reciprocation within one U-leg of the hopper adjacent to the lowermost point 18 of the bottom wall 15. The receptacle comprises a bottom end wall 24, three side walls 25, 26 and 27, and a false bottom 28 adjustable vertically by means of a screw 30. Any suitable mechanism, such as a lever 32 pivoted at 33 and oscillated by an eccentric 34 is provided for reciprocating the receptacle from the lowermost position shown in Fig. 4 to its uppermost position shown in broken lines in Fig. 3, a rod 36 connecting the free end of the lever with the receptacle. It will be apparent that the capacity of the receptacle can be varied by rotatably adjusting the screw 30.

The centrally disposed space 38 between the two legs of the wall 12 serves as a discharge chamber for the product being dispensed and the bottom 28 of the measuring receptacle slopes downwardly toward this chamber. The portion 40 of the inner wall 12 adjacent to the path of movement of the receptacle 22 is cut away to the height illustrated in Fig. 3, which height is such that the top of the wall 40 coincides with the lowermost point of the sloping bottom wall 28 when the receptacle is in its uppermost position (broken lines in Fig. 3). The bottom wall 39 of the discharge chamber 38 slopes downwardly and forwardly and at its foremost position merges into a chute 42 for receiving and discharging the product from the chamber 38. In passing through the apparatus, the product follows the line A—B indicated in Fig. 1.

The structure and function of the apparatus above described are believed to be apparent. The hopper 10 includes compactly within its outside walls 14 and 16, the storage space between the walls 12 and 14, the dispensing receptacle space at 22 and the discharging space at 38. A quantity of the product to be dispensed is deposited into the storage space between the walls 12 and 14 and slides down the bottom wall 15 by gravity. When the measuring receptacle is in its lowermost position the product flows thereinto (Fig. 4) and when the receptacle is raised its wall 25 passes freely upward through the product and the excess product spills back into the storage space (broken lines Fig. 4). The side of the receptacle facing the wall 40 is open and when the product reaches the top of this wall it spills over into the discharge chamber 38 (Fig. 3) and out of the chute 42, the receptacle having sufficient dwell at the top to permit complete emptying thereof. It will be apparent that the apparatus dispenses definite measured quantities of the product and functions freely through a minimum stroke without danger of crushing or breaking the product.

The apparatus illustrated in Figs. 1-5 dispenses each load of the product as the measuring receptacle reaches its topmost position. It may in some cases be desired to dispense the loads during the downward movement of the receptacle, and mechanism for performing this function is illustrated in Fig. 6. A cut-off slide has a vertically extending portion or gate 44 passing upwardly through the chute 42, the slide being adjustably fixed to the rod 36 by a set screw 46. When the dispensing receptacle is in its topmost position the load spills into the discharge chamber 38 and is trapped therein by the gate 44. The gate moves downwardly with the measuring receptacle and, when it passes below the chute, the trapped load is discharged. It will be apparent that the slide can be adjusted on the rod 36 to discharge the load during any portion of the downward movement of the measuring receptacle. This apparatus, illustrated in Fig. 6, is the same as that illustrated in Figs. 1-5 except for the addition of the gate 44.

In Fig. 7 I have illustrated my improved dispensing apparatus without the wall 20, in which case the product, not being held back by the wall 20, flows over the measuring receptacle to its full depth in the hopper when the receptacle is in its lowermost position. In this case, not only is the receptacle wall 25 required to travel upwardly through this entire depth of the product but a relatively large amount of overflow of the product from the receptacle must take place as the receptacle is raised. Furthermore, the receptacle must move through a relatively long stroke, as illustrated in broken lines at the top of Fig. 7. The functions served by the wall 20, as shown in Figs. 1-5, will now be apparent and, while the form of invention including this wall is preferable, it will be understood that both forms are within the scope of the invention herein disclosed.

Except as above described, the structures of Figs. 6 and 7 are substantially the same as that illustrated in Figs. 1-5 and are indicated by like reference characters.

It will be understood that a preferred embodiment of the invention is illustrated in the drawings as above described by way of example only. One important object of the invention is to provide a very compact storage chamber of maximum capacity providing for the free and unobstructed gravity flow of a product downwardly therethrough. The arcuately curved and downwardly sloping bottom wall 15 together with the cooperating side walls provides such a chamber of maximum capacity arranged compactly within a minimum space, all of which is of great importance in certain dispensing apparatus. It will also be apparent that while, as illustrated, the measuring receptacle at 22 and the discharge chute at 38—42 are disposed within the outline of the hopper construction 10, such mechanism can be disposed outside of said outline and in any arrangement that seems most efficient and cooperative. It will also be apparent that the apparatus can be constructed with or without the gate 44, as shown in Fig. 1.

Having thus disclosed my invention what I claim as new and desire to secure by Letters Patent is:

1. A dispensing apparatus, comprising a hopper, a vertically reciprocable measuring receptacle mounted to receive in its down position a load from the hopper, means providing a discharge chamber, the receptacle being adapted in its up position to deposit its load into the discharge chamber, and means for causing said load to be discharged from said chamber during a predetermined part of the down travel of the measuring receptacle.

2. The apparatus defined in claim 1 in which the last named means includes a cut-off slide connected to and operated by the measuring receptacle.

3. The apparatus defined in claim 1 in which the last named means includes a cut-off slide connected to and operated by the measuring receptacle, and means whereby the slide can be adjusted relative to the receptacle to vary the load discharging time relative to the reciprocatory position of the receptacle.

4. A dispensing apparatus, comprising a hopper having a bottom wall arcuately curved horizontally and sloping downwardly from one end to the other end and inner and outer side walls extending upwardly from the two side edges of the bottom wall, the apparatus having a discharge chamber located within the arc formed by the inner side wall, a fixed wall adjacent to the inner side wall at the bottom end of the bottom wall, a measuring receptacle mounted for vertical reciprocation at and upwardly from the lower end of the bottom wall and along the fixed wall, the receptacle having a side wall adjacent to the lower end of the hopper and being adapted in its down position to receive a load thereover from the hopper and in its up position to discharge the load over the fixed wall and into the discharge chamber, and means for reciprocating the receptacle to and between said down and up positions, the arcuate shape of the hopper together with the discharge chamber located therein providing compact maximum utility within a minimum space and the curved side walls of the hopper providing a free-flowing channel devoid of flow-obstructing corners.

5. A dispensing apparatus, comprising a hopper of U-shape configuration horizontally, a measuring receptacle mounted to reciprocate vertically in one U-leg of the hopper, a bottom wall in the hopper extending downwardly along the U-configuration from the other U-leg of the hopper to a position adjacent to the path of movement of the receptacle, and means providing a discharge chamber between the two legs of the hopper, the receptacle being adapted in its down position to receive a load from the hopper and in its up position to discharge the load into said chamber, and the U-shape of the hopper together with the discharge chamber located therein between the two legs thereof providing compact maximum utility within a minimum space and the curved side walls of the hopper providing a free-flowing channel devoid of flow-obstructing corners.

GRAYDON SMITH.